(12) United States Patent
Ajichi et al.

(10) Patent No.: US 8,154,689 B2
(45) Date of Patent: Apr. 10, 2012

(54) LIGHT EMITTING ELEMENT AND LIQUID CRYSTAL DISPLAY APPARATUS

(75) Inventors: Yuhsaku Ajichi, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 217 days.

(21) Appl. No.: 12/521,813

(22) PCT Filed: Apr. 24, 2008

(86) PCT No.: PCT/JP2008/057928
§ 371 (c)(1),
(2), (4) Date: Jun. 30, 2009

(87) PCT Pub. No.: WO2008/136349
PCT Pub. Date: Nov. 13, 2008

(65) Prior Publication Data
US 2010/0103346 A1 Apr. 29, 2010

(30) Foreign Application Priority Data
Apr. 26, 2007 (JP) ................................. 2007-117770

(51) Int. Cl.
*G02F 1/1335* (2006.01)
(52) U.S. Cl. ........................................................ 349/65
(58) Field of Classification Search ............... 349/65
See application file for complete search history.

(56) References Cited

U.S. PATENT DOCUMENTS

| | | | | |
|---|---|---|---|---|
| 7,311,431 B2 * | 12/2007 | Chew et al. | .................. | 362/613 |
| 2005/0259193 A1 | 11/2005 | Sumiyoshi et al. | | |
| 2005/0259441 A1 | 11/2005 | Arai et al. | | |
| 2006/0220040 A1 | 10/2006 | Suzuki | | |
| 2006/0221638 A1 | 10/2006 | Chew et al. | | |
| 2007/0014110 A1 | 1/2007 | Itaya | | |
| 2007/0058108 A1 | 3/2007 | Uehara et al. | | |
| 2008/0170178 A1 | 7/2008 | Kubota et al. | | |

FOREIGN PATENT DOCUMENTS

| | | |
|---|---|---|
| CN | 1683966 | 10/2005 |
| CN | 1896839 A | 1/2007 |
| JP | 10-334717 | 12/1998 |

(Continued)

OTHER PUBLICATIONS

English translation of the International Search Report mailed Jun. 24, 2008 in corresponding PCT application No. PCT/JP2008/057928.

(Continued)

*Primary Examiner* — James Dudek
(74) *Attorney, Agent, or Firm* — Nixon & Vanderhye P.C.

(57) ABSTRACT

A light-emitting element (1) includes a plurality of light-emitting diodes [3(R1, G11, . . . )] of two or more different colors, and a light-guiding member (4) for emitting, in the form of plane emission, light emitted by the plurality of light-emitting diodes [3(R1, G11, . . . )]. The plurality of light-emitting diodes are arranged in a predetermined order along the light-guiding member (4). A scattering member (31) for scattering light is provided on that side surface of the light-guiding member (4) which faces in a width direction (i.e., a direction along the direction that the light-emitting diodes (3) are arranged). Thus obtained is a white light source, free from coloration attributed to the color of a light-emitting diode disposed next to a side edge surface, whose colors have been sufficiently mixed.

11 Claims, 9 Drawing Sheets

FOREIGN PATENT DOCUMENTS

| | | |
|---|---|---|
| JP | 2003-141921 | 5/2003 |
| JP | 2003-177249 | 6/2003 |
| JP | 2003-187622 | 7/2003 |
| JP | 2005-183124 | 7/2005 |
| JP | 2005-285704 | 10/2005 |
| JP | 2006-64899 | 3/2006 |
| JP | 2006-267780 | 10/2006 |
| JP | 2006-269364 | 10/2006 |
| JP | 2006-269365 | 10/2006 |
| JP | 2006-351375 | 12/2006 |
| JP | 2007-065570 | 3/2007 |
| JP | 2007-95624 | 4/2007 |
| JP | 2007-95635 | 4/2007 |
| WO | 2008/136359 A1 | 11/2008 |

OTHER PUBLICATIONS

Nikkei Electronics, No. 844, (Mar. 31, 2003), pp. 126-127.
U.S. Appl. No. 12/530,323, filed Sep. 8, 2009, entitled Light Emitting Element and Liquid Crystal Display Device.
International Search Report for PCT/JP2008/053956, mailed Jun. 10, 2008.
Office Action from U.S. Appl. No. 12/530,323 mailed Nov. 9, 2011; Ajichi.

* cited by examiner

LIGHT EMITTING ELEMENT AND LIQUID CRYSTAL DISPLAY APPARATUS

This application is the U.S. national phase of International Application No. PCT/JP2008/057928 filed 24 Apr. 2008, which designated the U.S. and claims priority to Japan Application No. 2007-117770 filed 26 Apr. 2007, the entire contents of each of which are hereby incorporated by reference.

TECHNICAL FIELD

The present invention relates to a light-emitting element including (i) a light source unit having a plurality of light-emitting diodes, arranged in a predetermined order, which are of at least two different colors and (ii) a light-guiding member for emitting, in the form of plane emission, light emitted by the light-emitting diodes, the light-guiding member having (a) a color-mixing section for mixing colors of the light emitted by the light-emitting diodes and (b) a display section for emitting, in the form of plane emission, the light whose colors have been mixed by the color-mixing section.

BACKGROUND ART

A liquid crystal display apparatus has an illuminating device provided on a front or back surface of a liquid crystal panel. A light source provided on a back surface of a liquid crystal panel is generally called a "backlight", which is categorized as either a direct type backlight, which has a light source disposed directly under a liquid crystal panel, or an edge light type backlight, which has a light source disposed on a lateral side of a light-guiding member and thereby achieves a surface light source.

Both of the types of backlight generally use cold-cathode fluorescent tubes as their light sources. However, in recent years, an illuminating device using mercury-free light-emitting diodes as a light source has been developed out of environmental concerns.

Cases where white illuminating devices are obtained by using light-emitting diode as light sources are categorized into (i) a case where a white illuminating device is obtained by using white light-emitting diodes each of which is a combination of a blue light-emitting diode and a yellow light-emitting fluorescent material and (ii) a case where a white illuminating device is obtained by disposing plural sets of monochromatic light-emitting diodes of different colors such as red, green, and blue and by mixing their colors. Recently, a backlight, capable of expressing a wide range of color reproduction, in which red, green, and blue monochromatic light-emitting diodes are used in combination has been attracting attention.

For example, liquid crystal televisions (LE-40M91B) each including a direct type backlight in which red, green, and blue monochromatic light-emitting diodes are used in combination have been mass-produced. In a set of light-emitting diodes of the three primary colors in which red, green, and blue light-emitting diodes are used in combination, it is necessary to mix the colors of the light-emitting diodes so as to produce white light. For this purpose, the light-emitting diodes are placed at a certain distance from a diffusing plate required for obtaining uniform light, whereby a uniformly-white backlight is achieved.

In a uniformly-white edge light type backlight obtained by combining red, green, and blue monochromatic light-emitting diodes, light-emitting diodes of the same color are disposed at intervals of not less than 10 mm in consideration of the intervals at which they are mounted, because each of the light-emitting diodes has a width of approximately 3 mm. This requires a special way of mixing colors of emitted light. Lumileds Lighting, LLC proposes a method in which a color-mixing section for mixing colors of emitted light is not used as a display section (Non Patent Literature 1). As described in this method, in order to obtain a uniformly-white backlight by combining red, green, and blue monochromatic light-emitting diodes, it is necessary to provide (a) a color-mixing section for mixing colors of emitted light and (b) a display section that glows white.

CITATION LIST

Patent Literature 1

Japanese Patent Application Publication, Tokukai, No. 2006-236951 A (Publication Date: Sep. 7, 2006)

Patent Literature 2

Japanese Patent Application Publication, Tokukai, No. 2003-187622 A (Publication Date: Jul. 4, 2003)

Patent Literature 3

Japanese Patent Application Publication, Tokukai, No. 2005-183124 A (Publication Date: Jul. 7, 2005)

Patent Literature 4

Japanese Patent Application Publication, Tokukai, No. 2005-332681 A (Publication Date: Dec. 2, 2005)

Patent Literature 5

Japanese Patent Application Publication, Tokukai, No. 2005-332680 A (Publication Date: Dec. 2, 2005)

Non Patent Literature 1

NIKKEI ELECTRONICS, Mar. 31, 2003, No. 844, p. 126-127

SUMMARY OF INVENTION

In such a structure as described above in which a light-guiding member includes a display section and a color-mixing section, light whose colors have been mixed by passage through the color-mixing section of a certain length appears white in the display section. However, on an edge surface of the light-guiding member, light emitted by a light-emitting diode disposed at the farthest edge accounts for a large proportion of the entire light. Therefore, for example, if the color of the light-emitting diode disposed at the farthest edge is red, light emitted through a discontinuous side edge surface of the light-guiding member is not quite white, rather a little reddish. This has been a problem with the above structure.

An angular characteristic of the output luminance of a light-emitting diode is not such that the light-emitting diode emits light of the same luminance at any angle, but such that the luminance of light emitted frontward is highest and the luminance decreases with an increase in angle from the front. For example, in the ease of use of light-emitting diodes of the three primary colors R, G, and B, a white light source whose colors have been sufficiently mixed is obtained in front of an R light-emitting diode, because light obliquely emitted by each of the G and B light sources disposed on the right and left sides of the R light-emitting diode is guided toward the display section in front of the R light-emitting diode and the colors of the light of the R, G, and B light-emitting diodes are mixed with one another. However, for example, on a right edge surface of the light-guiding member, although the colors of light emitted obliquely rightward by the light sources on the left side are mixed, light of a color other than the color of a light-emitting diode disposed at the rightmost edge is low in light intensity, because there are no light sources on the right side. In addition, light emitted by the light-emitting diode disposed at the rightmost edge is totally reflected at the right edge surface. Accordingly, light of the color of the light-emitting diode disposed at the rightmost edge increases in light intensity. As a result, light emitted through a side edge surface of the light-guiding member is colored with the color of the light-emitting diode disposed at the farthest edge. This has been a problem with the above structure.

The present invention has been made in view of the foregoing problems, and it is an object of the present invention to achieve a light-emitting element capable of providing a white light source, free from coloration attributed to the color of a light-emitting diode disposed next to a side edge surface of the light-guiding member, whose colors have been sufficiently mixed.

In order to attain the above object, a light-emitting element according to the present invention includes a plurality of light sources of two or more different colors; and a light-guiding member for emitting, in a form of plane emission, light emitted by the plurality of light sources, the plurality of light sources being arranged in a predetermined order along the light-guiding member, the light-guiding member being provided with scattering means for scattering light, the scattering means being provided on a side surface of the light-guiding member, the side surface facing in a direction that the plurality of light sources are arranged.

The light-emitting element according to the present invention includes (i) a plurality of light sources that emit two or more different colors of light and (ii) a light-guiding member for diffusing the light of the light sources and emitting the light in the form of plane emission.

In this structure, since the scattering means is provided on that side surface of the light-guiding member which faces in the direction that the light sources are arranged, light falling from the light sources onto the light-guiding member is scattered without being totally reflected by the side surface of an edge portion of the light-guiding member. This causes a reduction in light intensity of light that has been emitted by a light source disposed so as to face the edge portion of the light-guiding member and is guided toward a display section. This makes it possible to reduce coloration attributed to the color of a light source disposed at the farthest edge of an array of light sources, and to thereby achieve a uniformly-white light source.

It should be noted that a direction along the direction that the light sources are arranged along the light-guiding member can be rephrased as a width direction of the light-guiding member.

The light-emitting element of the present invention may be structured such that the light-guiding member has (a) a color-mixing section for mixing colors of the light emitted by the plurality of light sources and (b) a display section for emitting, in the form of plane emission, the light whose colors have been mixed by the color-mixing section.

This structure makes it possible to sufficiently mix the colors of the light in the color-mixing section and then emit the light in the form of plane emission in the display section, thus achieving a more uniformly-white light source.

It should be noted that in this structure, a direction extending from the light sources toward the display section of the light-guiding member is a length direction of the light-guiding member, whereas a direction intersecting with the length direction is the aforementioned width direction of the light-guiding member.

The light-emitting element of the present invention may be structured such that the scattering means is a scattering member attached to the side surface of the light-guiding member.

In this structure, since the scattering member is attached to the side surface of the light-guiding member, light falling from the light sources onto the light-guiding member is scattered without being totally reflected by the side surface of the edge portion of the light-guiding member. This makes it possible to reduce coloration attributed to the color of a light source disposed at the farthest edge, and to thereby achieve a uniformly-white light.

The light-emitting element of the present invention may be structured such that the scattering means is a microfabrication provided on the side surface of the light-guiding member.

In this structure, since the side surface of the light-guiding member is microfabricated, light falling from the light sources onto the light-guiding member is scattered without being totally reflected by the side surface of the edge portion of the light-guiding member. This makes it possible to reduce coloration attributed to the color of a light source disposed at the farthest edge, and to thereby achieve a uniformly-white light source.

The light-emitting element of the present invention may be structured such that each of the plurality of light sources is a red light-emitting diode, a green light-emitting diode, or a blue light-emitting diode; and the plurality of light sources are constituted by a combination of the red, green, and blue light-emitting diodes.

This structure makes it possible to achieve a light-emitting element including a light source having a wide range of color reproduction.

In order to attain the above object, a light-emitting element according to the present invention includes: a plurality of light sources of two or more colors; and a light-guiding member for emitting, in a form of plane emission, light emitted by the plurality of light sources, the plurality of light sources being arranged in a predetermined order along the light-guiding member, the light-guiding member having (a) a color-mixing section for mixing colors of the light emitted, by the plurality of light sources and (b) a display section for emitting, in the form of plane emission, the light whose colors have been mixed by the color-mixing section, the color-mixing section of the light-guiding member being provided with scattering means for scattering light, the scattering means being provided on at least either an outside or inside surface of an edge portion of the color-mixing section with respect to a direction that the plurality of light sources are arranged.

The light-emitting element according to the present invention includes (i) a plurality of light sources that emit two or more different colors of light and (ii) a light-guiding member for diffusing the light of the light sources and emitting the light in the form of plane emission.

It should be noted that a direction along the direction that the light sources are arranged along the light-guiding member can be rephrased as a width direction of the light-guiding member. Accordingly, in this structure, a direction extending from the light sources toward the display section of the light-guiding member is a length direction of the light-guiding member, whereas a direction intersecting with the length direction is the aforementioned width direction of the light-guiding member.

In this structure, since the scattering means is provided on at least either the outside or inside surface of the edge portion of the light-guiding member with respect to the width direction of the light-guiding member, light falling from the light sources onto the light-guiding member is scattered by the edge portion of the light-guiding member. This causes a reduction in light intensity of light that has been emitted by a light source disposed so as to face the edge portion of the light-guiding member and is guided toward the display section. This makes it possible to reduce coloration attributed to the color of a light source disposed at the farthest edge of an array of light sources, and to thereby achieve a uniformly-white light source.

The light-emitting element of the present invention may be structured such that the scattering means is a scattering member attached to at least either the outside or inside surface of the edge portion of the color-mixing section of the light-guiding member.

In this structure, since the scattering member is attached to at least either the outside or inside surface of the edge portion of the light-guiding member with respect to the width direction of the light-guiding member, light falling from the light sources onto the light-guiding member is scattered by the edge portion of the light-guiding member. This causes a reduction in light intensity of light that has been emitted by a light source disposed so as to face the edge portion of the light-guiding member and is guided toward the display section. This makes it possible to reduce coloration attributed to the color of a light source disposed at the farthest edge of an array of light sources, and to thereby achieve a uniformly-white light source.

The light-emitting element of the present invention may be structured such that the scattering means is a microfabrication provided on at least either the outside or inside surface of the edge portion of the color-mixing section of the light-guiding member.

In this structure, since at least either the outside or inside surface of the edge portion of the light-guiding member with respect to the width direction is microfabricated, light falling from the light sources onto the light-guiding member is scattered by the edge portion of the light-guiding member. This causes a reduction in light intensity of light that has been emitted by a light source disposed so as to face the edge portion of the light-guiding member and is guided toward the display section. This makes it possible to reduce coloration attributed to the color of a light source disposed at the farthest edge of an array of light sources, and to thereby achieve a uniformly-white light source.

The light-emitting element of the present invention may be structured such that each of the plurality of light sources is a red light-emitting diode, a green light-emitting diode, or a blue light-emitting diode; and the plurality of light sources are constituted by a combination of the red, green, and blue light-emitting diodes.

This structure makes it possible to achieve a light-emitting element including a light source having a wide range of color reproduction.

In order to attain the above object, a light-emitting element according to the present invention includes: a plurality of light sources of two or more different colors; and a light-guiding member for emitting, in a form of plane emission, light emitted by the plurality of light sources, the plurality of light sources being arranged in a predetermined order along the light-guiding member, the light-guiding member having a side surface serving as an absorbing surface for absorbing light, the side surface facing in a direction that the plurality of light sources are arranged.

The light-emitting element of the present invention includes (i) a plurality of light sources that emits two or more different colors of light and (ii) a light-guiding member for diffusing the light of the light sources and emitting the light in the form of plane emission.

In this structure, since that side surface of the light-guiding member which faces in the direction that the light sources are arranged serves as an absorbing surface for absorbing light, light falling from the light sources onto the light-guiding member is absorbed by the side surface of an edge portion of the light-guiding member. This causes a reduction in light intensity of light that has been emitted by a light source disposed so as to face the edge portion of the light-guiding member and is guided toward the display section. This makes it possible to reduce coloration attributed to the color of a light source disposed at the farthest edge of an array of light sources, and to thereby achieve a uniformly-white light source.

It should be noted that a direction along the direction that the light sources are arranged along the light-guiding member can be rephrased as a width direction of the light-guiding member.

The light-emitting element of the present invention may be structured such that the light-guiding member has (a) a color-mixing section for mixing colors of the light emitted by the plurality of light sources and (b) a display section for emitting, in the form of plane emission, the light whose colors have been mixed by the color-mixing section.

This structure makes it possible to sufficiently mix the colors of the light in the color-mixing section and then emit the light in the form of plane emission in the display section, thus achieving a more uniformly-white light source.

It should be noted that in this structure, a direction extending from the light sources toward the display section of the light-guiding member is a length direction of the light-guiding member, whereas a direction intersecting with the length direction is the aforementioned width direction of the light-guiding member.

The light-emitting element of the present invention may be structured such that each of the plurality of light sources is a red light-emitting diode, a green light-emitting diode, or a blue light-emitting diode; and the plurality of light sources are constituted by a combination of the red, green, and blue light-emitting diodes.

This structure makes it possible to achieve a light-emitting element including a light-guiding source having a wide range of color reproduction.

In order to attain the above object, a liquid crystal display apparatus according to the present invention includes: a liquid crystal panel; and a backlight for irradiating the liquid crystal panel with light, the backlight including one of the light-emitting elements as set forth above.

The liquid crystal display device of the present invention includes the light-emitting element of the present invention as a backlight. This makes it possible to irradiate a liquid crystal panel with light whose colors have been sufficiently mixed to produce white, thereby improving display quality.

For a fuller understanding of the nature and advantages of the invention, reference should be made to the ensuing detailed description taken in conjunction with the accompanying drawings.

REFERENCE NUMERALS

1 Light-emitting Element
2 Optical Unit
3 Light-emitting Diode
4 Light-guiding Member
4b Side Surface (side surface of the light-guiding member that faces in a width direction)
4b' Microfabricated Side Surface
5 Color-mixing Section
6 Display Section
7 Driver (Luminous-intensity Adjusting Means)
9 Chassis
10 Liquid Crystal Display Apparatus
11 Liquid Crystal Panel
12 Illuminating Device
13 Optical Sheet
14 Reflecting Sheet
15 Substrate
31 Scattering Member (Scattering Means) (provided on a side surface of the light-guiding member)
32 Scattering Member (Scattering Means) (provided on an outside or inside surface of the light-guiding member)
33 Microfabrication (Scattering Means) (provided on the outside or inside surface of the light-guiding member)
34 Absorbing Member (Absorbing Surface)

DESCRIPTION OF EMBODIMENTS

Figure 1:
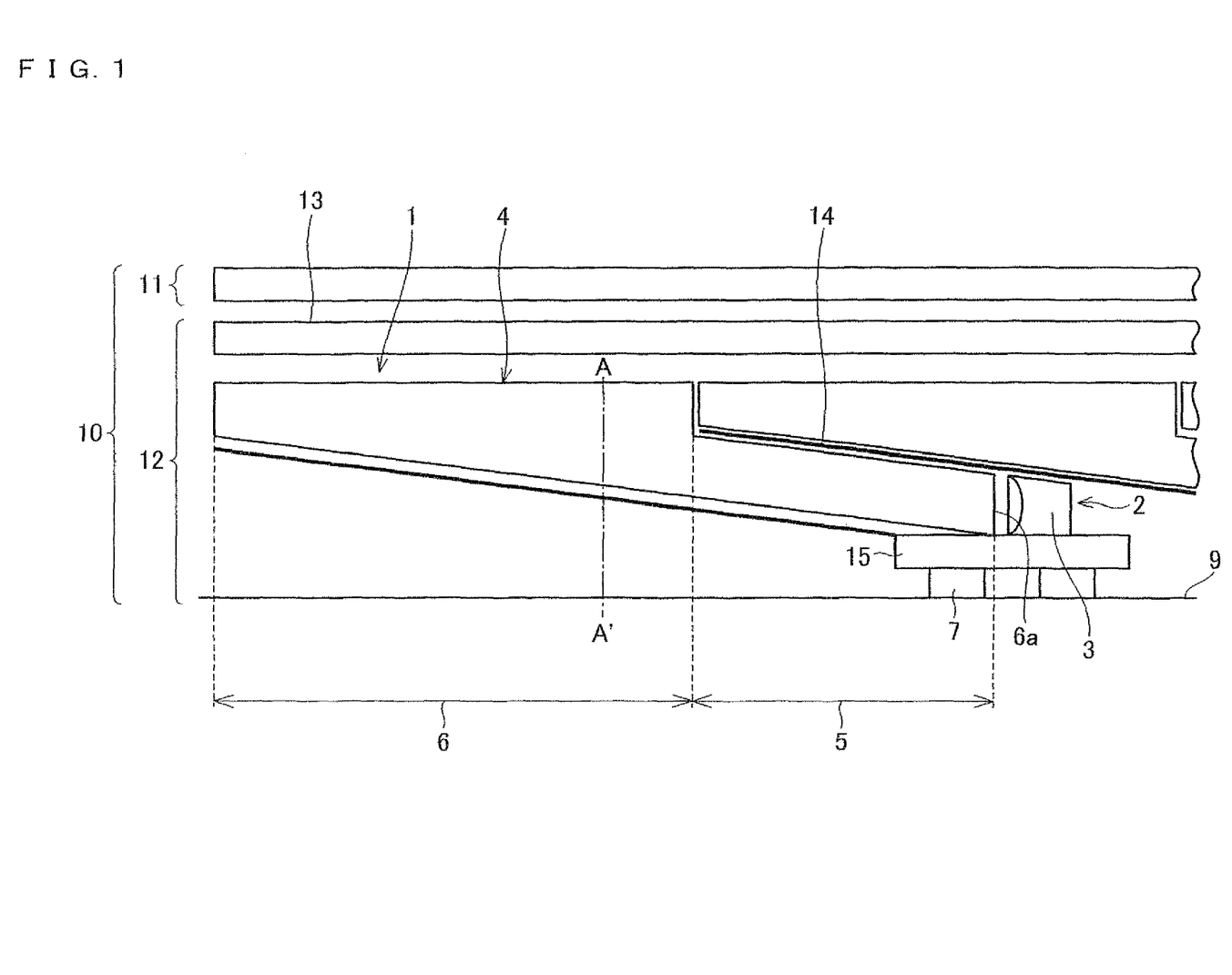
FIG. 1 is an elevation view illustrating a structure of a light-emitting element according to the present embodiment.
Figure 2:
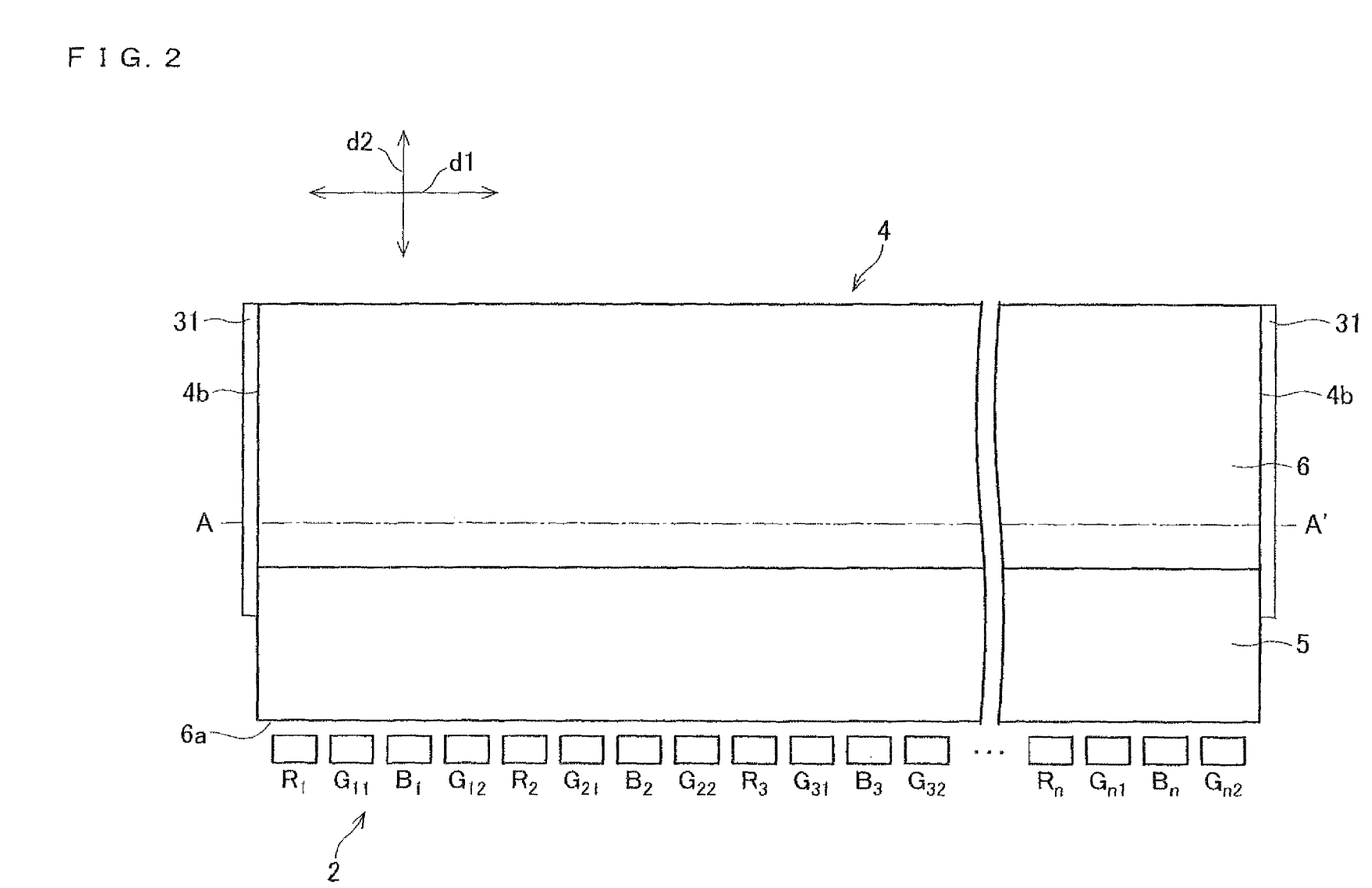
FIG. 2 is a plan view illustrating the structure of the light-emitting element of FIG. 1.

One embodiment of the present invention is described below with reference to FIGS. 1 to 4. FIG. 1 is an elevation view illustrating a structure of a light-emitting element 1 according to the present embodiment. FIG. 2 is a plan view of the structure of the light-emitting element 1 of FIG. 1.

A liquid crystal display apparatus 10 of the present embodiment includes the light-emitting element 1 of the present embodiment as a backlight. For example, as shown in FIG. 1, the liquid crystal display apparatus 10 includes (i) a liquid crystal panel 11 and (ii) an illuminating device 12 provided so as to face the liquid crystal panel 11. The light-emitting element 1, which constitutes the illuminating device 12, is a light-emitting element of the present embodiment. The illuminating device 12 irradiates the liquid crystal panel 11 with light. The liquid crystal panel 11 is not particularly limited, and as such, may be realized by a publicly known liquid crystal panel.

Next, the illuminating device 12 of the present embodiment is described. For example, as shown in FIG. 1, the illuminating device 12 includes a plurality of light-guiding members 4 disposed in parallel with one another. Specifically, each of the light-guiding members 4 includes (i) a display section 6 having a light emitting surface and (ii) a color-mixing section 5 for guiding, toward the display section 6, light emitted by light-emitting diodes 3 (light sources), and for mixing colors of the light emitted by the light-emitting diodes. The display section 6 and the color-mixing section 5 differ in thickness from each other at least in a place where they are joined together. Further, the light-guiding members are arranged such that the display section 6 of one light-guiding member 4 is on top of the color-mixing section 5 of another light-guiding member 4 disposed next to the former light-guiding member 4. The light-emitting surfaces of the light-guiding members 4 thus arranged form a flat light-emitting surface (that serves as a light-emitting surface of the backlight 2 as a whole). Such a structure of the illuminating device is called a tandem structure. Provided on a side of the light-guiding member 4 opposite to the liquid crystal panel 11 is a reflecting sheet 14.

Positioned so as to face a light entrance section 6a of the light-guiding member 4 is an optical unit 2. The optical unit 2 includes a plurality of light-emitting diodes 3 disposed along the light entrance section 6a. Each of the light-emitting diodes 3 is mounted on a substrate 15. Each of the light-guiding members 4 includes (i) a color-mixing section 5 for mixing colors of light emitted by the light-emitting diodes 3 and (ii) a display section 6 for emitting, in the form of plane emission, the light whose colors have been mixed by the color-mixing section 5. Since the display section 6 emits light in the form of plane emission and irradiates the liquid crystal panel 11 with the light, the display section 6 can also be called a light emitting section.

Disposed on the underside of the substrate 15 is a driver 7 for turning on the light-emitting diodes. Disposed below the substrate 15 so as to house these members is a chassis 9. Further disposed above the light-guiding member 4 is an optical sheet 13 that uniformizes and converges light emitted from the display section 6 of the light-guiding member 4 and then irradiates the liquid crystal panel 11 with the light. The following describes each of the structures.

As described above, the illuminating device 12 has a light-guiding member 4. The light-guiding member 4 is not particularly limited, and as such, may be realized by a publicly known light-guiding member. In addition, the light-guiding member does not need to be shaped as shown in FIGS. 1 and 2. The number of light-guiding members 4 is not particularly limited, and as such, may be determined as needed depending on the size or the like of an object to be illuminated (i.e., the liquid crystal panel 11). In the case where a plurality of light-guiding members 4 are used, the light-guiding members 4 are preferably disposed in parallel with one another. The light-guiding members 4 are not particularly limited in intervals at which they are disposed; however, it is preferable that adjacent light-guiding members 4 be disposed with no space therebetween. In this structure, since the plurality of light-guiding members 4 are uniformly distributed across the illuminating device 12 with no space therebetween, it is possible to irradiate the liquid crystal panel 11 with light higher in uniformity of luminance.

The optical sheet 13 is described here. Generally, the optical sheet 13 is formed from (i) a diffusing plate for irradiating the liquid crystal panel 11 with uniform light, (ii) a diffusing sheet for scattering light while converging it, (iii) a lens sheet for increasing frontal luminance by converging light, (iv) a polarized light reflecting sheet for increasing the luminance of the liquid crystal display apparatus by reflecting one polarization component of light and transmitting the other polarization component of the light, or (v) the like. These components are used in combination as needed depending on the price and/or performance of the liquid crystal display apparatus.

The illuminating device 12 includes a reflecting sheet 14 for reflecting a part of light outputted from the light-guiding member 4 and light reflected back from the optical sheet 13. More specifically, the part of the light outputted from the light-guiding member 4 and the light reflected back from the optical sheet 13 are reflected by the reflecting sheet 14, and the reflected light is guided, in the form of plane emission, toward the diffusing plate, the diffusing sheet, the lens sheet, or the polarized light reflecting sheet, which forms the optical sheet 13. As described above, "in the form of plane emission" means that the intensity of light on a plane parallel to the diffusing plate, the diffusing sheet, the lens sheet, or the polarized reflecting sheet is substantially uniform. It should be noted that although the plurality of light-guiding members 4 is each provided with a reflecting sheet 14 in FIG. 1, the number of reflecting sheets 14 does not need to be identical to the number of light-guiding members 4 and the reflecting sheets 14 may be made by integral molding.

The plurality of light-emitting diodes 3 are mounted on the substrate 15 in such a way as to be arranged along the light entrance section 6a of the light-guiding member 4. The light-emitting diodes 3 used here are red (R), green (G), and blue (B) LEDs. As shown in FIG. 2, the LEDs are arranged along the light entrance section 6a of the light-guiding member 4 in such a way that the LEDs R1, G11, B1, G12, R2, G21, B2, G22, ... Rn, Gn1, Bn, and Gn2 are arranged in this order from a side surface 4b of the light-guiding member 4, with a sequence of R, G, B, and G LEDs as a set. In the right edge portion of the light-guiding member 4, the LEDs Rn, Gn1, Bn, and Gn2 are arranged in this order, and the rightmost LED "Gn2" is lower in luminous intensity than the other green LEDs. The R LEDs progressively increase in luminous intensity toward the center with distance from the edges. That is, the R LEDs progressively increase in luminous intensity toward the center with distance from the left edge, and progressively decrease in luminous intensity toward the right edge with distance from the center. The same applies to the G and B LEDs.

How to combine the LEDs and how to arrange the LEDs in order are not limited to the above examples. The LEDs are preferably disposed at regular intervals, but do not need to be so disposed.

Instead of being arranged with a sequence of "LEDs R, G, B, and G" as a set, the R, G, and B LEDs may be arranged, for example, with a sequence of "G, R, B, and G LEDs" as a set as described in paragraph [0250] of Patent Literature 5. Such an arrangement of R, G, and B LEDs allows improved color mixing.

The driver 7 is mounted together with the light-emitting diodes 3 on the same substrate 15. This makes it possible to reduce the number of substrates and the number of connectors for joining the substrates, thereby achieving a cost reduction. Further, since the number of substrates is small, it is possible to achieve a thinner illuminating device.

The light-emitting diodes 3 are preferably disposed as close as possible to the light-guiding member 4. This allows light emitted by the light-emitting diode 3 to more efficiently enter the light-guiding member 4, thereby achieving a high-efficiency illuminating device.

The light-guiding member 4 is made of a transparent resin such as PMMA (methyl methacrylate resin) or polycarbonate. The transparent resin is not limited to the PMMA and polycarbonate, and any transparent resin is applicable.

The light-guiding member 4 is made by injection molding, extrusion molding, heat press molding, cutting work, or the like. However, the light-guiding member 4 is not limited to these molding method, and as such, may be made by any processing method as long as the light-guiding member 4 exhibits the same characteristic.

In the present embodiment, the light-emitting diodes 3 are such that the LED "R1.", disposed next to a side surface 4b existing in an edge portion of the light-guiding member 4 with respect to a width direction d1, is lower in luminous intensity than the other LEDs. This makes it possible to reduce red coloration in the edge portion next to the side surface 4b of the light-guiding member 4, thereby achieving a white light source uniform in color in every part of its surface. In this case, the luminous intensity of the LED "R1" can be reduced by (i) causing the driver 7 to supply the LED "R1" with a current lower in value than those supplied to the other LEDs, (ii) causing the driver 7 to supply the LED "R1" with a current smaller in pulse width than those supplied to the other LEDs, or (Hi) selecting an LED low in luminous intensity as the LED "R1".

Figure 3:
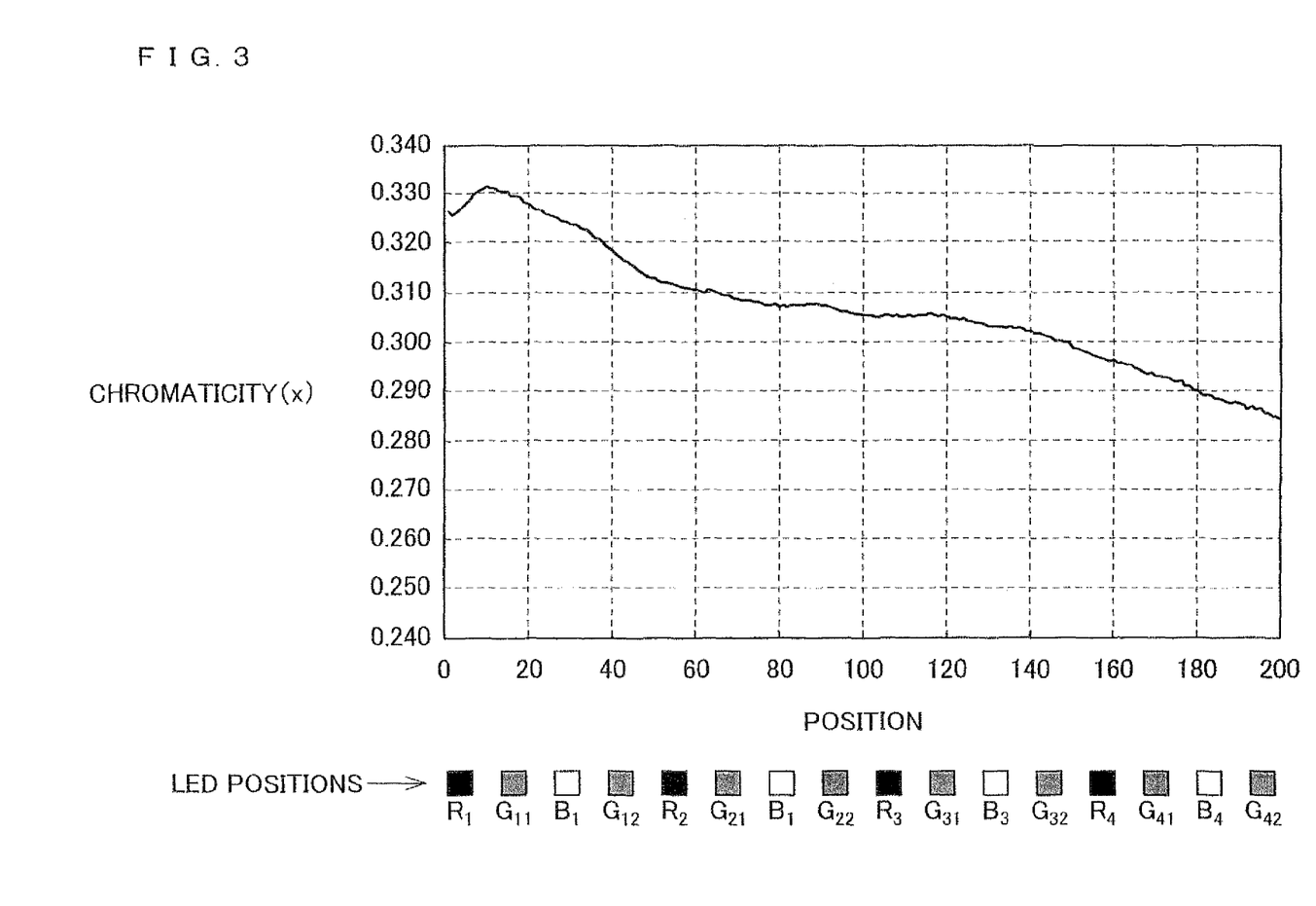
FIG. 3 is a graph showing the chromaticity x of a light-guiding member, with no reduction in luminous intensity of an LED.
Figure 4:
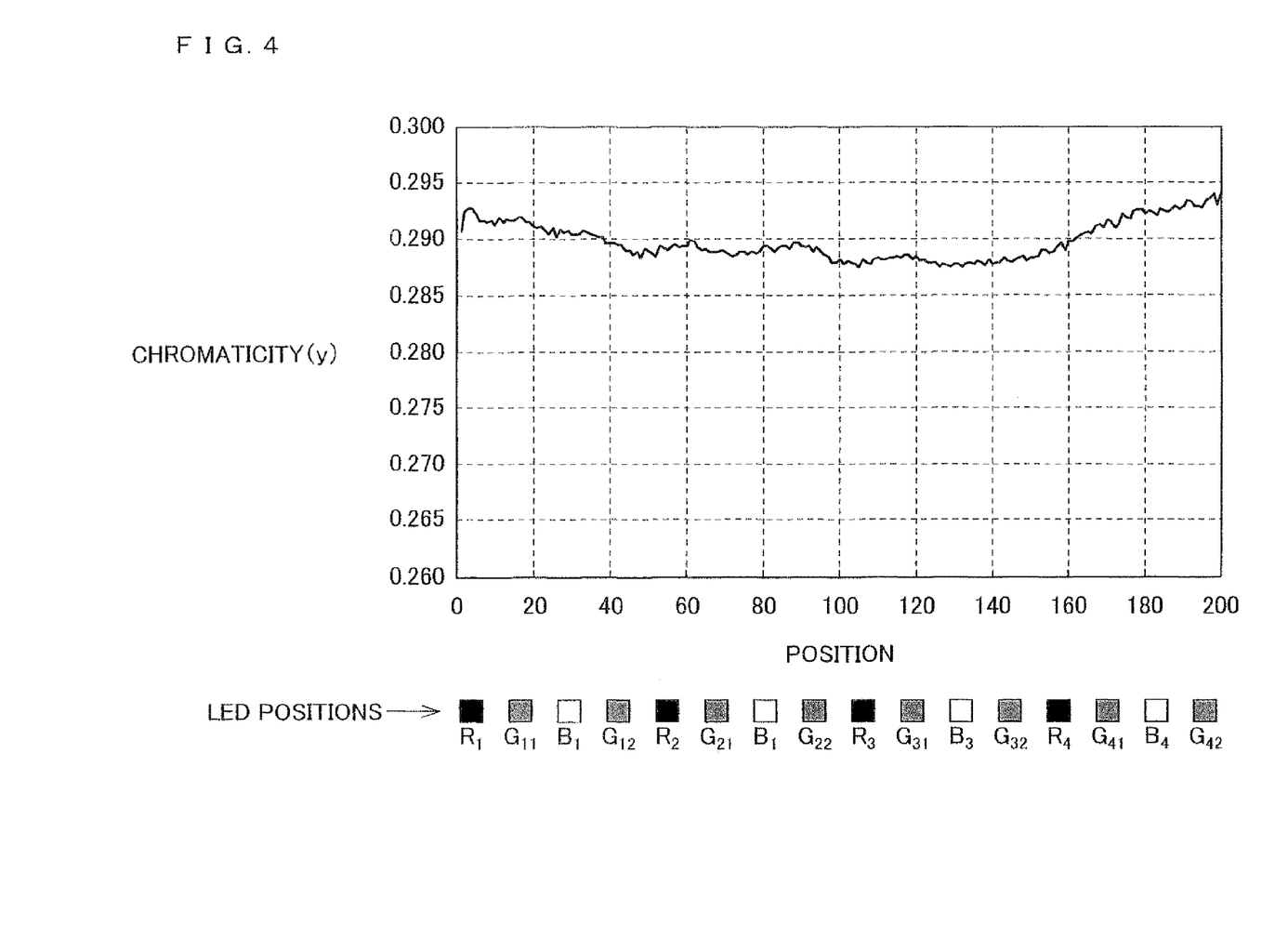
FIG. 4 is a graph showing the chromaticity y of the light-guiding member, with no reduction in luminous intensity of an LED.

FIG. 3 is a graph showing chromaticity "x" on a cross-section surface taken along the line A-A' of FIG. 2, with no reduction in luminous intensity of the LED "R1" as compared to the other LEDs. Similarly, FIG. 4 is a graph showing chromaticity "y" on the cross-section surface taken along the line A-A' of FIG. 2, with no reduction in luminous intensity of the LED "R1" as compared to the other LEDs. In each of FIGS. 3 and 4, the horizontal axis indicates positions on the light entrance section 6a of the light-guiding member. The horizontal axis is graduated such that: one edge portion (for example, the left edge) of the light-guiding member 4 is marked with "0"; a central portion of the light-guiding member 4 is marked with "100"; and the other edge portion (for example, the right edge) of the light-guiding member 4 is marked with "200". In this way, the chromaticity "x" takes on a larger value in the edge portion of the light-guiding member. This reveals that red coloration occurs in the edge portion of the light-guiding member. In contrast, the present embodiment allows uniformity in both the chromaticity "x" and "y" regardless of location, thereby achieving a uniformly-white illuminating device.

Described above is an example in which the LED "R1", disposed at the farthest edge, is made lower in luminous intensity than the other LEDs. However, the present invention is not limited to the above example.

For example, the LEDs may be arranged so as to have such gradations of luminous intensity as:

R1<R2<R3 ... ,
G11<G12<G21<G22 ...
B1<B2<B3 ... , wherein the LEDs progressively decrease in luminous intensity toward the edges of the light-guiding member with distance from the center.

Further attached to a side surface 4b in an edge portion of the light-guiding member 4 with respect to a width direction d1 is a scattering member 31 (scattering means).

As shown in FIG. 2, the width direction d1 of the light-guiding member 4 is a direction along the direction that the light-emitting diodes 3 are arranged in a predetermined order. Further, as shown in FIG. 2, a direction intersecting with the width direction d1 (specifically, a direction substantially orthogonal to the width direction d1) is a length direction d2 of the light-guiding member 4. The length direction d2 of the light-guiding member 4 can be rephrased as a direction extending from the light-emitting diodes 3 toward the display section 6 of the light-guiding member 4.

Specific examples of the scattering member encompass an adhesive and a white reflecting sheet. By using one of these, light falling onto the light-guiding member from the light-emitting diodes 3 (specifically, the LED "R1" and LED "Gn2") disposed at the farthest edges of the light entrance section 6a of the light-guiding member 4 is scattered without being totally reflected by the side surfaces 4b. As a result, the LED "R1" and the LED "Gn2" decrease in light intensity on the side surfaces 4b of the light-guiding member. This makes it possible to reduce red or green coloration in the display section 6 in either edge portion of the light-guiding member, thereby achieving a uniformly-white illuminating device.

Figure 6:
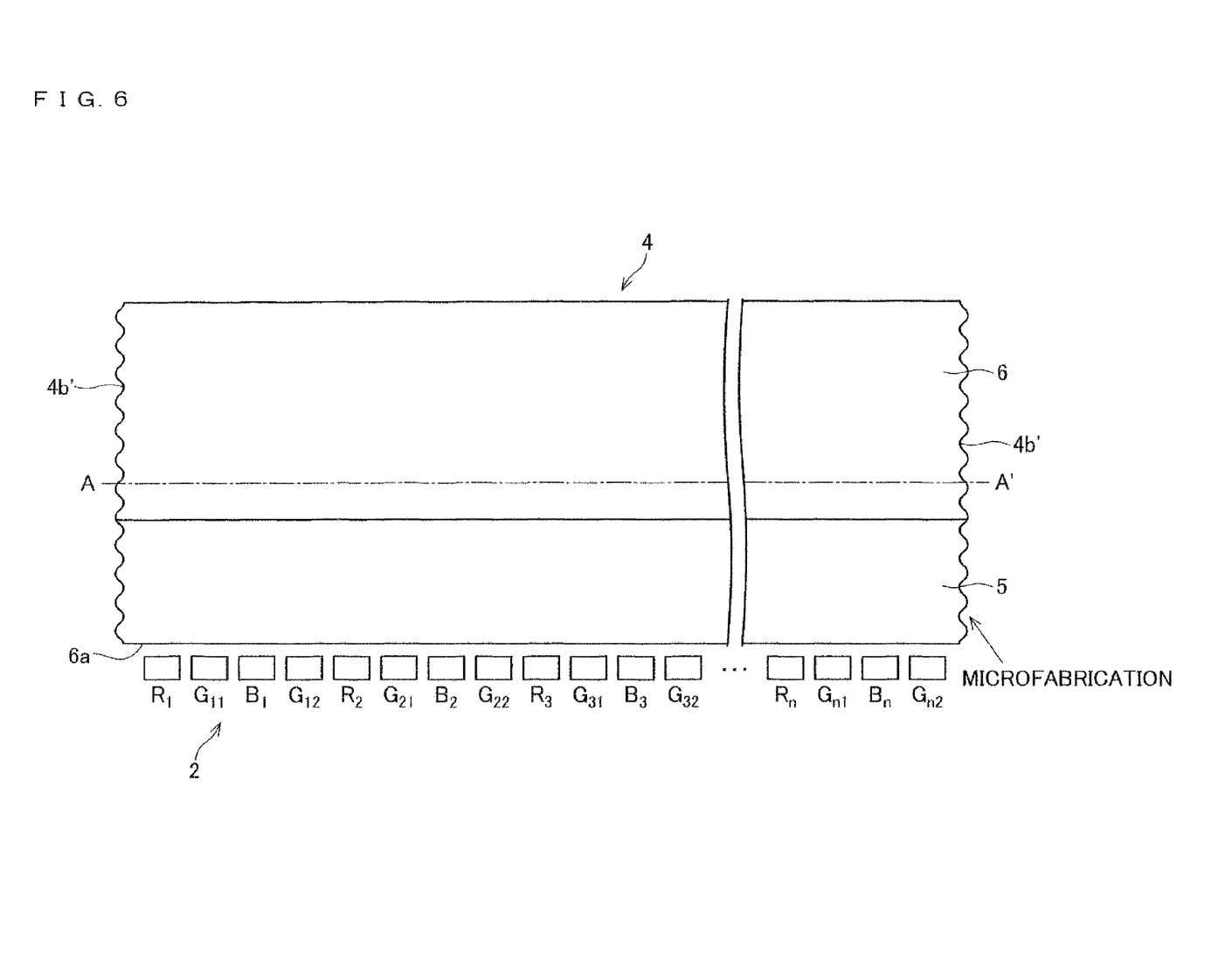
FIG. 6 is a plan view showing a structure of a light-emitting element according to another embodiment of the present invention.

The same advantage can be attained by breaking down a condition of total reflection at the side surface 4b through a method for microfabricating the side surface 4b, as well as the method for attaching the scattering member to the side surface 4b. That is, as shown in FIG. 6, it is possible to realize scattering means by microfabricating that side surface 4b' of the light-guiding member 4 which faces in a width direction d1. The microfabrication is achieved by filing the side surface 4b', roughing a surface of the light-guiding member by sand-blasting or the like, or processing the surface of the light-guiding member so that it works as a prism or a lens.

Figure 5:
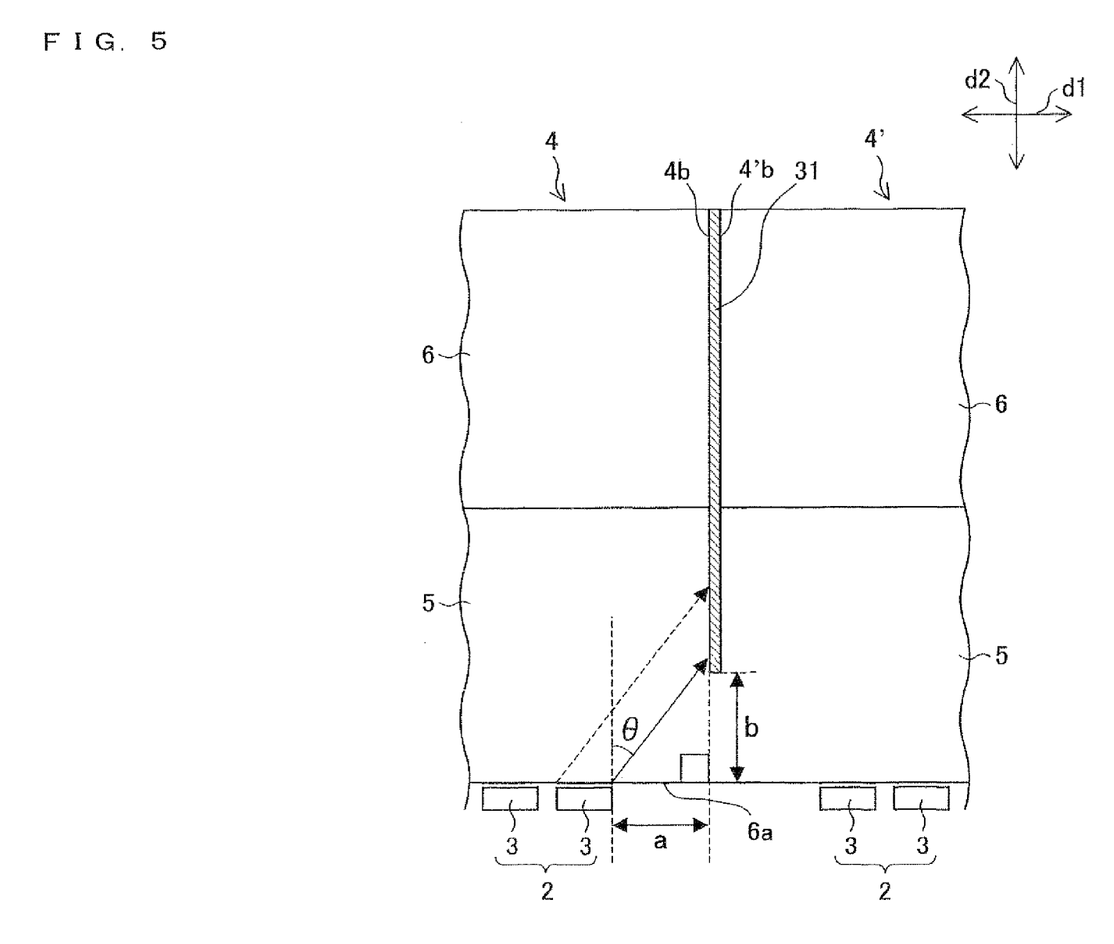
FIG. 5 is a schematic view showing a scattering member provided between two light-guiding members disposed next to each other.

A specific range within which a scattering member 31 is disposed is described here with reference to FIG. 5. FIG. 5 shows a scattering member 31 provided between two light-guiding members 4 and 4' disposed next to each other along the width direction d1 of the light-guiding member 4. The scattering member 31 is attached to a side surface 4b of the light-guiding member 4 and a side surface 4'b of the light-guiding member 4', thus breaking down a condition of total reflection at each of the side surfaces 4b and 4'b.

Meanwhile, in the case of a point light source such as a light-emitting diode, a line of light emitted by the light source radiates at a critical angle θ in a light-guiding member. The critical angle θ depends on the refractive index n of a material of which the light-guiding member is made. For example, in the case where the light-guiding member is made of polycarbonate, the refractive index n=1.59, and the critical angle θ is approximately 39 degrees. Similarly, in the case where the light-guiding member is made of an acrylic resin, the refractive index n=1.49, and the critical angle θ is approximately 42 degrees.

Assume here that the distance from (i) an edge of a light emitting surface of a light-emitting diode 3 nearest the side surface 4b of the light-guiding member 4 to (ii) the side surface 4b of the light-guiding member 4 is a. Then, as shown in FIG. 5, light emitted by the light-emitting diode 3 nearest the side surface 4b does not reach a certain area on the side surface 4b. The area ranges from the light entrance section 6a of the light-guiding member 4 to a point that is at a distance of less than x from the light entrance section 6a. The distance x is represented by the following mathematical formula 1:

$$x = a \times \tan(90° - \theta) \quad \text{Math. 1}$$

For this reason, the scattering member 31 does not need to be provided in the area, which ranges from the light entrance section 6a to the point that is at a distance of less than x from the light entrance section 6a.

Therefore, if the distance from the light entrance section 6a to that edge of the scattering member 31 which faces the light entrance section 6a is b, it is preferable that 0<b<x. This makes it possible to surely dispose the scattering member 31 on the side surface 4b of the light-emitting member 4 so that the scattering member 31 is positioned in an area that is reached by light emitted by the light-emitting diode 3.

On the other hand, as shown in FIG. 5, it is preferable that the scattering member 31 be provided so as to reach that farthest edge portion of the side surface 4b at an edge of the display section 6 with respect to the length direction d2. This makes it possible to completely scatter light having reached the side surface 4b.

Figure 9:
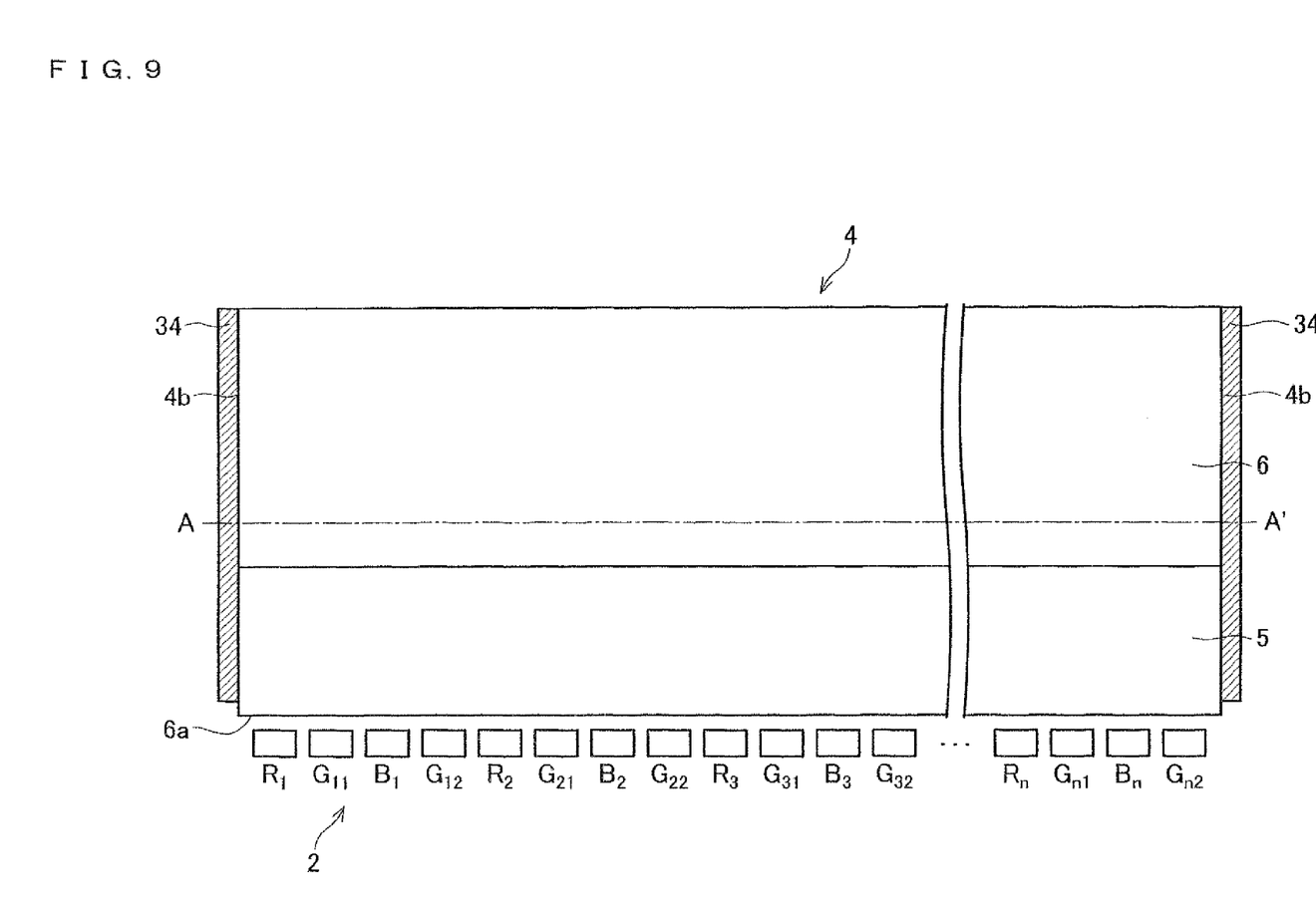
FIG. 9 is a plan view showing a structure of a light-emitting element according to still yet another embodiment of the present invention.

The same advantage can be attained by breaking down a condition of total reflection at the side surface 4b through a method for causing that side surface 4b of the light-guiding member 4 which faces in width direction d1 to serve as an absorbing surface, as well as the method for providing such scattering means as described above. The absorbing surface can be achieved by printing black on the side surface 4b. Alternatively, as shown in FIG. 9, the absorbing surface can be achieved by attaching a light-absorbing member 34 (e.g., black colored paper) to the side surface 4b.

A range within which the absorbing surface is disposed is not described here, because the range is the same as the range within which the scattering member 31 is disposed.

Figure 7:
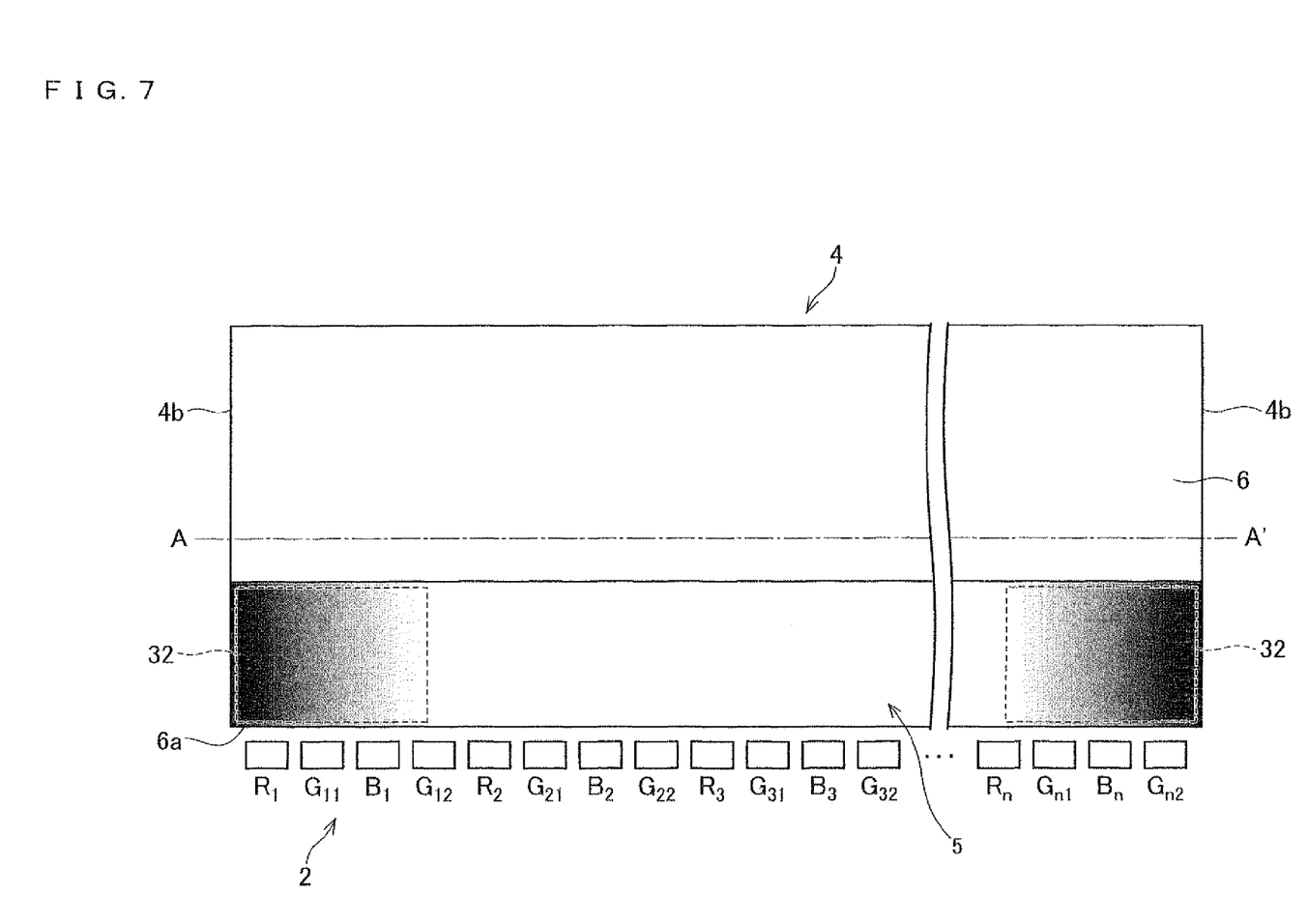
FIG. 7 is a plan view showing a structure of a light-emitting element according to still another embodiment of the present invention.

Further, FIG. 7 shows another embodiment in which a scattering member 32 (scattering means) is attached to an outside or inside surface of the color-mixing section 5 so as to be in the vicinity of an edge portion of the light-guiding member 4 with respect to a width direction d1. In FIG. 7, the scattering member 32 is indicated by dotted lines. In this structure, for example, the scattering means breaks down a condition of total reflection of light falling onto the light-guiding member 4 from the LED "R1" disposed closest to the side surface 4b of the light-guiding member 4, so that the LED "R1" decreases in light intensity in the edge portion of the light-guiding member. It should be noted that the scattering member 32 may be attached to either or both of the outside and inside surfaces.

As described above, "a scattering member is provided on an outside or inside surface of the light-guiding member 4 in the vicinity of an edge portion of the light-guiding member 4 with respect to a width direction d1" means that "the scattering member is attached to the outside or inside surface of the light-guiding member 4 with a certain degree of width from the edge portion of the light-guiding member 4". The scattering member only needs to be provided so as to break down a condition of total reflection at the side surface 4b of the light-guiding member 4.

Specific examples of the scattering member 32 encompass an adhesive and a white reflecting sheet. By using one of these, light falling onto the light-guiding member 4 from, the light-emitting diode 3 (specifically, the LED "R1" and the LED "Gn2") disposed at the farthest edges of the light entrance section 6a of the light-guiding member 4 is scattered without being totally reflected by the side surfaces 4b. As a result, the LED "R1" and the LED "Gn2" decrease in light intensity in the edge portions of the light-guiding member.

This makes it possible to decrease red or green coloration in the display section 6 in either edge portion of the light-guiding member, thereby achieving a uniformly-white illuminating device.

Figure 8:
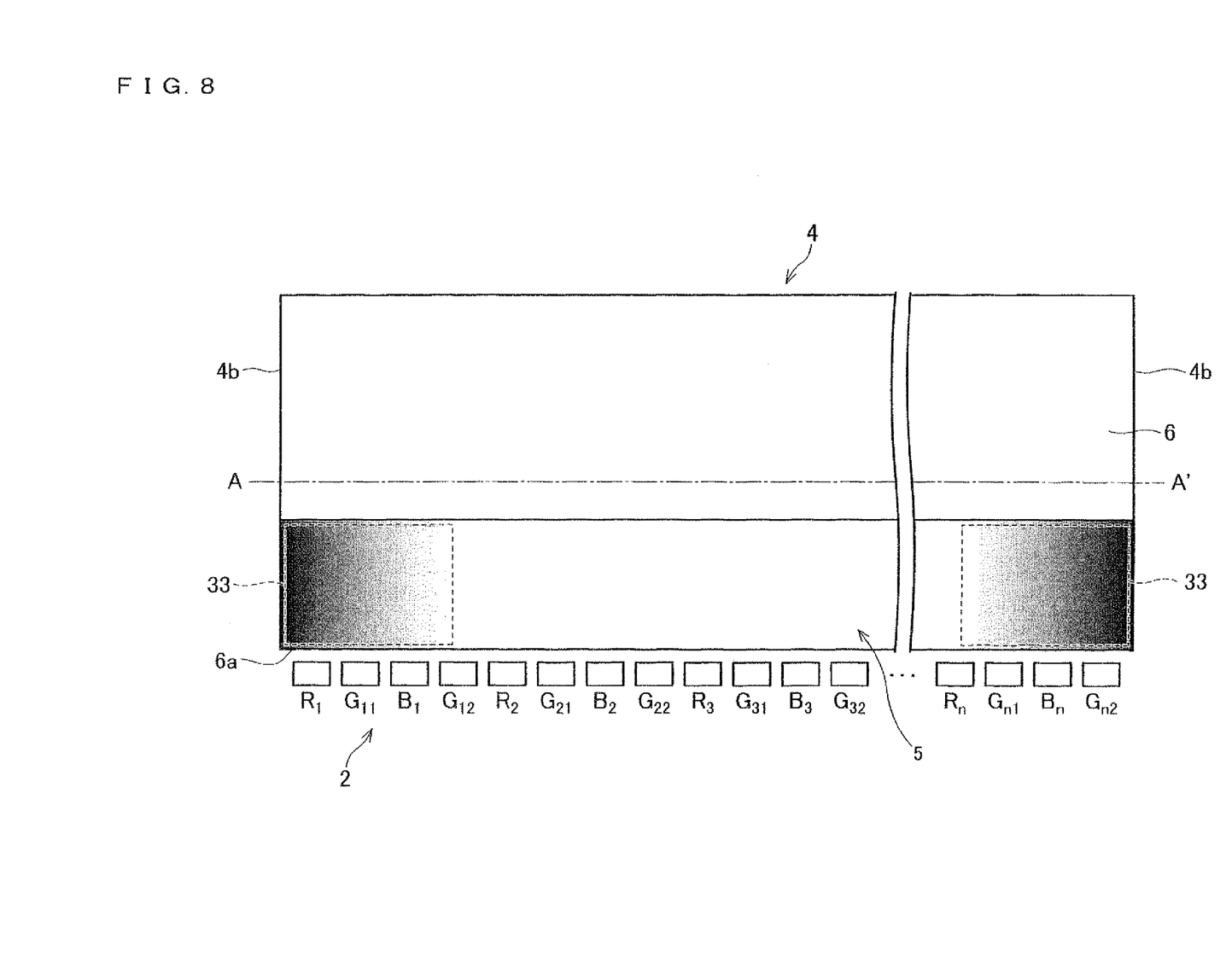
FIG. 8 is a plan view showing a structure of a light-emitting element according to yet another embodiment of the present invention.

The same advantage can be attained by breaking down a condition of total reflection at the side surface 4b through a method for microfabricating the outside or inside surface of the color-mixing section 5 in the vicinity of the edge portion of the light-guiding member, as well as the method for attaching the scattering member to at least either the outside or inside surfaces of the color-mixing section 5 in the vicinity of the edge portion of the light-guiding member. That is, as shown in FIG. 8, the scattering means can be realized by providing a microfabrication 33 on the outside or inside surface of the color-mixing section 5 of the light-guiding member 4 in the vicinity of the edge portion of the light-guiding member 4 with respect to the width direction d1. In FIG. 8, an area, provided with the microfabrication 33 is indicated by dotted lines. It should be noted that the microfabrication 33 may be provided on either or both of the outside and inside surfaces.

As described above, "providing a microfabrication 33 on the outside or inside surface of the light-guiding member 4 in the vicinity of the edge portion of the light-guiding member 4 with respect to the width direction d1" means that "the microfabrication 33 is provided on the outside or inside surface of the light-guiding member 4 with a certain degree of width from the edge portion of the light-guiding member 4". The microfabrication only needs to be provided so as to break down a condition of total reflection at the side surface 4b of the light-guiding member 4.

The microfabrication can be achieved by filing the outside or inside surface of a predetermined area of the light-guiding member 4, roughing a surface of the light-guiding member by sandblasting or the like or processing the surface of the light-guiding member so that it works as a prism or a lens.

The invention is not limited to the description of the embodiments above, but may be altered within the scope of the claims. An embodiment based on a proper combination of technical means disclosed in different embodiments is encompassed in the technical scope of the invention.

Moreover, the light-emitting element of the present invention may be structured so as to include (i) a light source unit having a plurality of light-emitting diodes, arranged in a predetermined order, which are of two or more different colors (ii) a light-guiding member for emitting, in the form of plane emission, light emitted by the plurality of light-emitting diodes, the light-guiding member having (a) a color-mixing section for mixing colors of the light emitted by the plurality of light-emitting diodes and (b) a display section for emitting, in the form of plane emission, the light whose colors have been mixed by the color-mixing section, the light-guiding member being provided with luminous-intensity adjusting means for adjusting the luminous intensity of each of the light-emitting diodes so that the light-emitting diodes progressively decrease in luminous intensity with distance from the center toward a position facing an edge of the light-guiding member.

This structure makes it possible to prevent coloration attributed to the color of a light-emitting diode disposed next to a side edge surface on a discontinuous side surface of the light-guiding member, thus achieving a white light source whose colors have been sufficiently mixed. Such a light-emitting element makes it possible to achieve a liquid crystal display apparatus with a narrow frame.

In the light-emitting element of the present invention, it is preferable that the light source unit include a red light-emitting diode, a green light-emitting diode, and a blue light-emitting diode.

This structure makes it possible to achieve a light-emitting element including a light source having a wide range of color reproduction.

In the light-emitting element of the present invention, it is preferable that the luminous-intensity adjusting means adjust the luminous intensity of each of the light-emitting diodes by adjusting the value of a current to be supplied to each of the light-emitting diodes.

This structure makes it possible to prevent coloration attributed to the color of a light-emitting diode disposed next to a side edge surface on a discontinuous side surface of the light-guiding member, thus achieving a light source whose colors have been sufficiently mixed. Further, it is possible to reduce power consumption by supplying the light-emitting diodes with currents that progressively decrease in value with distance from a central light-emitting diode toward a light-emitting diode positioned to face an edge of the light-guiding member.

In the light-emitting element of the present invention, it is preferable that the luminous-intensity adjusting means adjust the luminous intensity of each of the light-emitting diodes by adjusting the pulse width of a current to be supplied to each of the light-emitting diodes.

This structure makes it possible to prevent coloration attributed to the color of a light-emitting diode disposed next to a side edge surface on a discontinuous side surface of the light-guiding member, thus achieving a white light source whose colors have been sufficiently mixed. Further, it is possible to reduce power consumption by supplying the light-emitting diodes with currents that progressively decrease in pulse width toward a light-emitting diode positioned to face an edge of the light-guiding member.

In the light-emitting element of the present invention, it is preferable that the luminous-intensity adjusting means is constituted by the plurality of light-emitting diodes and the plurality of light-emitting diodes be disposed in such a way that the luminous intensities of the light-emitting diodes with respect to the values of currents to be supplied decrease progressively from the center toward a position facing an edge of the light-guiding member.

In this structure, a light-emitting diode high in luminous intensity is used near the center of the light-guiding member, and a light-emitting diode low in luminous intensity is used near an edge portion of the light-guiding member. This makes it unnecessary to sort light-emitting diodes. This makes it possible to reduce costs of the light-emitting diodes.

The light-emitting element of the present invention may be structured so as to include (i) a light source unit having a plurality of light-emitting diodes, arranged in a predetermined order, which are of two or more different colors and (ii) a light-guiding member for emitting, in the form of plane emission, light emitted by the plurality of light-emitting diodes, the light-guiding member having (a) a color-mixing section for mixing colors of light emitted by the plurality of light-emitting diodes and (b) a display section for emitting, in the form of plane emission, the light whose colors have been mixed by the color-mixing section, the light-guiding member being provided with a scattering member attached to a side surface thereof.

In this structure, because of the scattering member provided in an edge portion of the light-guiding member so as to be attached to the side surface of the light-guiding member, light falling from the light-emitting diodes onto the light-guiding member is scattered without being totally reflected by the side surface of the edge portion of the light-guiding member. This makes it possible to reduce coloration attributed to the color of a light-emitting diode disposed at the farthest edge, and to thereby achieve a uniformly-white light source.

The light-emitting element of the present invention may be structured so as to include (i) a light source unit having a plurality of light-emitting diodes, arranged in a predetermined order, which are of two or more different colors and (ii) a light-guiding member for emitting, in the form of plane emission, light emitted by the plurality of light-emitting diodes, the light-guiding member having (a) a color-mixing section for mixing colors of the light emitted by the plurality of light-emitting diodes and (b) a display section for emitting, in the form of plane emission, the light whose colors have been mixed by the color-mixing section, the light-guiding member having a side surface microfabricated.

In this structure, since the side surface of the light-guiding member is microfabricated, light falling from the light-emitting diodes onto the light-guiding member in an edge portion of the light-guiding member is scattered without being totally reflected by the side surface the edge portion of the light-guiding member. This makes it possible to reduce coloration attributed to the color of a light-emitting diode disposed at the farthest edge, and to thereby achieve a uniformly-white light source.

The light-emitting element of the present invention may be structured so as to include (i) a light source unit having a plurality of light-emitting diodes, arranged in a predetermined order, which are of two or more different colors and (ii) a light-guiding member for emitting, in the form of plane emission, light emitted by the plurality of light-emitting diodes, the light-guiding member having (a) a color-mixing section for mixing colors of the light emitted by the plurality of light-emitting diodes and (b) a display section for emitting, in the form of plane emission, the light whose colors have been mixed by the color-mixing section, the color-mixing section of the light-guiding member being provided with a scattering member attached to an outside or inside surface of the color-mixing section in the vicinity of an edge portion of the color-mixing section.

In this structure, since the scattering member is attached to the outside or inside surface of the color-mixing section in the vicinity of the edge portion of the color-mixing section of the light-guiding member, light falling from the light-emitting diodes onto the light-guiding member in an edge portion of the light-guiding member is scattered by the scattering member. This causes a reduction in light intensity of light that is guided toward the display section. This makes it possible to reduce coloration attributed to the color of a light-emitting diode disposed at the farthest edge, and to thereby achieve a uniformly-white light source.

The light-emitting element of the present invention may be structured so as to include (i) a light source unit having a plurality of light-emitting diodes, arranged in a predetermined order, which are of two or more different colors and (ii) a light-guiding member for emitting, in the form of plane emission, light emitted by the plurality of light-emitting diodes, the light-guiding member having (a) a color-mixing section for mixing colors of the light emitted by the plurality of light-emitting diodes and (b) a display section for emitting, in the form of plane emission, the light whose colors have been mixed by the color-mixing section, the color-mixing section of the light-guiding member having an outside or inside surface microfabricated in the vicinity of an edge portion of the color-mixing section.

In this structure, since the outside or inside surface of the color-mixing section of the light-guiding member is microfabricated in the vicinity of the edge portion of the color-mixing section, light falling from the light-emitting diodes onto the light-guiding member in an edge portion of the light-guiding member is scattered by the microfabricated outside or inside surface. This causes a reduction in light intensity of light that is guided toward the display section. This makes it possible to reduce coloration attribute to the color of a light-emitting diode disposed at the farthest edge, and to thereby achieve a uniformly-white light source.

The light-emitting diode of the present invention may be structured so as to include (i) a light source unit having a plurality of light-emitting diodes, arranged in a predetermined order, which are of two or more different colors and (ii) a light-guiding member for emitting, in the form of plane emission, light emitted by the plurality of light-emitting diodes, the light-guiding member having (a) a color-mixing section for mixing colors of the light emitted by the plurality of light-emitting diodes and (b) a display section for emitting, in the form of plane emission, the light whose colors have been mixed by the color-mixing section, the light-guiding member having a side surface serving as an absorbing surface.

In this structure, since the side surface of the light-guiding member serves as an absorbing surface, light falling from the light-emitting diodes onto the light-guiding member is absorbed by the side surface of an edge portion of the light-guiding member in the edge portion of the light-guiding member. This makes it possible to reduce coloration attributed to the color of a light-emitting diode disposed at the farthest edge, and to thereby achieve a uniformly-white light source.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a light-emitting element including (i) a light source unit having a plurality of light-emitting diodes, arranged in a predetermined order, which are of at least two different colors and (ii) a light-guiding member for emitting, in the form of plane emission, light emitted by the light-emitting diodes, the light-guiding member having (a) a color-mixing section for mixing colors of the light emitted by the light-emitting diodes and (b) a display section for emitting, in the form of plane emission, the light whose colors have been mixed by the color-mixing section. Further, the light-emitting element of the present invention is applicable to a backlight of a liquid crystal display apparatus.

The invention claimed is:

1. A light-emitting element comprising:
   a plurality of light sources of two or more different colors;
   a light-guiding member for emitting, in a form of plane emission, light emitted by the plurality of light sources, the plurality of light sources being arranged in a predetermined order along the light-guiding member,
   the light-guiding member being provided with scattering means for scattering light, the scattering means being provided on a side surface of the light-guiding member, the side surface facing in a direction that the plurality of light sources are arranged, and wherein said light sources are aligned in at least a first direction, and said side surface of the light-guiding member upon which the scattering means is provided extends in a second direction that is substantially perpendicular to the first direction and which extends away from the light sources.

2. The light-emitting element according to claim 1, wherein the light-guiding member has (a) a color-mixing section for mixing colors of the light emitted by the plurality of light sources and (b) a display section for emitting, in the form of plane emission, the light whose colors have been mixed by the color-mixing section.

3. The light-emitting element according to claim 1, wherein the scattering means is a scattering member attached to the side surface of the light-guiding member.

4. The light-emitting element according to claim 1, wherein the scattering means is a microfabrication provided on the side surface of the light-guiding member.

5. The light-emitting element according to claim 1, wherein:
each of the plurality of light sources is a red light-emitting diode, a green light-emitting diode, or a blue light-emitting diode; and
the plurality of light sources are constituted by a combination of the red, green, and blue light-emitting diodes.

6. A light-emitting element comprising:
a plurality of light sources of two or more colors;
a light-guiding member for emitting, in a form of plane emission, light emitted by the plurality of light sources,
the plurality of light sources being arranged in a predetermined order along the light-guiding member,
the light-guiding member having (a) a color-mixing section for mixing colors of the light emitted by the plurality of light sources and (b) a display section for emitting, in the form of plane emission, the light whose colors have been mixed by the color-mixing section,
the color-mixing section of the light-guiding member being provided with scattering means for scattering light, the scattering means being provided on at least either an outside or inside surface of an edge portion of the color-mixing section with respect to a direction that the plurality of light sources are arranged, and wherein said light sources are aligned in at least a first direction, and s surface of the light-guiding member upon which the scattering means is provided extends in a second direction that is substantially different than the first direction and which extends away from the light sources.

7. The light-emitting element according to claim 6, wherein the scattering means is a scattering member attached to at least either the outside or inside surface of the edge portion of the color-mixing section of the light-guiding member.

8. The light-emitting element according to claim 6, wherein the scattering means is a microfabrication provided on at least either the outside or inside surface of the edge portion of the color-mixing section of the light-guiding member.

9. The light-emitting element according to claim 6, wherein:
each of the plurality of light sources is a red light-emitting diode, a green light-emitting diode, or a blue light-emitting diode; and
the plurality of light sources are constituted by a combination of the red, green, and blue light-emitting diodes.

10. A liquid crystal display apparatus comprising:
a liquid crystal panel; and
a backlight for irradiating the liquid crystal panel with light,
the backlight including a light-emitting element as set forth in claim 1.

11. A liquid crystal display apparatus comprising:
a liquid crystal panel; and
a backlight for irradiating the liquid crystal panel with light,
the backlight including a light-emitting element as set forth in claim 6.

* * * * *